United States Patent [19]

Braun et al.

[11] Patent Number: 4,643,296

[45] Date of Patent: Feb. 17, 1987

[54] CONVEYOR TROUGH SECTION CONSTRUCTION

[75] Inventors: Gert Braun; Ernst Braun, both of Essen-Heisingen, Fed. Rep. of Germany

[73] Assignee: Halbach & Braun Industrieanlagen, Fed. Rep. of Germany

[21] Appl. No.: 766,951

[22] Filed: Aug. 19, 1985

[30] Foreign Application Priority Data

Aug. 25, 1984 [DE] Fed. Rep. of Germany ....... 3431351

[51] Int. Cl.$^4$ ............................................. B65G 19/28
[52] U.S. Cl. .................................. 198/735; 198/860.3
[58] Field of Search ...................... 198/735, 860.2, 583, 198/860.3

[56] References Cited

U.S. PATENT DOCUMENTS 3,842,966 10/1974 Blumenthal et al. ............... 198/735

FOREIGN PATENT DOCUMENTS

| F 16666 | 11/1956 | Fed. Rep. of Germany | 198/735 |
| 828438 | 5/1938 | France | 198/735 |
| 1053067 | 1/1954 | France | 198/735 |
| 78032 | 12/1954 | Netherlands | 198/735 |
| 660462 | 11/1951 | United Kingdom | 198/735 |
| 1405095 | 9/1975 | United Kingdom | 198/735 |
| 2028750 | 3/1980 | United Kingdom | 198/735 |
| 2095195 | 9/1982 | United Kingdom | 198/735 |

*Primary Examiner*—Joseph E. Valenza
*Attorney, Agent, or Firm*—McGlew and Tuttle

[57] ABSTRACT

A trough section for conveyor troughs have a carrying run with a wear tub resting on a trough bottom. The trough has sidewalls forming a trough profile in the carrying run into which the tube is exchangeably insertable. The wear tub comprises on both sides one or more fixing pockets, while the trough section has side walls with lateral flanges, of which the working side lateral flange comprises one or more pivotably mounted fixing shackles which can be pivoted into a corresponding one of the fixing pockets and are lockable therein.

13 Claims, 4 Drawing Figures

CONVEYOR TROUGH SECTION CONSTRUCTION

FIELD AND BACKGROUND OF THE INVENTION

This invention relates in general to chain conveyor troughs and in particular to a new and useful trough section for a conveyor trough.

The invention relates particularly to a trough section for a conveyor trough, with trough sidewalls and a trough bottom connecting the trough sidewalls with formation of a carrying (upper) run and an empty (lower) run, where at least into the carrying run a wear tub, lying on the trough bottom and having tub sidewalls forming the trough profile in the carrying run, is exchangeably insertable, and where the trough sidewalls are formed in the region of the carrying run as lateral flanges for connecting the wear tub. What is involved, therefore, is a trough section for a conveyor trough as regularly used in single chain conveyors or double chain conveyors which are preferably used in underground operations. In such conveyors, the drivers attached to the chain strands revolving in the carrying run and empty run are guided in the V-profiles of the generally V-shaped trough sidewalls.

A continual problem in chain conveyors used in underground operations results from the wear of the conveyor trough or the trough sections thereof. For then it is necessary to replace the trough sections. This replacement, however, presents considerable difficulties, for the reason along that the attachment parts can be detached only at considerable expense of time and personnel. For this reason trough sections have been designed where a wear tub with tub sidewalls forming the trough profile in the carrying run, resting on the trough bottom is exchangeably insertable at least into the carrying run. To this end, the trough sidewalls are formed in the region of the carrying run as lateral flanges for connecting expansion parts on the outside and for connecting the wear tub on the inside. Normally the wear tub is fixed by means of hold-down strips to be screwed onto the lateral flanges in the carrying run. To replace the wear tub, not only must these hold-down strips be removed on the stowage side and on the working side, but moreover hoists must be set up symmetrically, to be able to remove the wear tub exactly vertically from the respective trough section to avoid jamming. All this does not make for easy installing, is complicated and difficult. The invention is intended to remedy this.

SUMMARY OF THE INVENTION

The invention provides a trough section for a conveyor trough, where the wear tub is constructed so that it can readily be inserted or replaced from the stowage side alone.

The invention includes a trough section with a wear tub which has, on both sides, one or more fixing pockets on the outside of the tub. At the working side the lateral flange of the trough section has one or more fixing lugs engaging into the fixing pockets, and at the stowage side the lateral flange of the trough section has one or more fixing shackles mounted pivotably, which in a pivoted-in fixing position engage into the associated fixing pockets and are lockable. As a result of these measures of the invention, the wear trough can be pivoted into the carrying run from the stowage side. Naturally, for that purpose the required clearance between the two lateral flanges and the wear tub exists. First the wear tub is pivoted down on the working side and slipped with its working side fixing pockets onto the fixing lugs present there on the lateral flange. Therafter the wear tub is pivoted in on the stowage side. Then the wear tub is fixed by means of the stowage side fixing shackles, which in turn are pivoted into the stowage side fixing pockets and locked. The installing as well as the changing of the wear tub can, therefore, be performed exclusively from the stowage side without requiring symmetrically applied hoists, although hoists are worked with. To this end the wear tub has lifting holes on both sides.

Other features essential to the invention are enumerated in the following:

Thus, the wear tub has preferably on both sides two fixing pockets arranged at a given distance and is shorter by a given measure than the trough section, so that a gap forms between the wear tubs of trough sections connected with one another. This gap between adjacent tub sections serves both for inserting a chain tensioning device for the chain belt, and for preventing pileups or jamming between the tub sections when passing through depressions, so that the wear tubs always remain removable. The fixing lugs pass through the workingside lateral flange or are welded to this lateral flange on the inside, and according to a preferred form of the invention, they are designed as hinge wedges extending in the longitudinal direction of the trough. Hinge wedges means that the wear tub can be placed with its fixing pockets onto these hinge wedges in hinge fashion and can be pivoted in or out. To facilitate installation, the fixing pockets expediently have conically tapering slide-in faces for the hinge wedges, that is, they are designed in funnel form as it were. According to a preferred form of the invention it is provided that, in the fixed position, the fixing shackles pass through the stowage side lateral flange of the trough section and are mounted between horizontal bearing cheeks to pivot about vertical bearing spindles. The shackles have wedge-shaped projections corresponding to the fixing lugs with bearing cheeks being fastened or welded to the lateral flange and/or to cross webs of the lateral flange. In consideration of the fact that the wear tub has fixing pockets on both sides, and that moreover the fixing lugs and the fixing shackles have with respect to the wedge-shaped projections an indentical cross section adapted to the fixing pockets, it is always possible to insert the wear tub properly between the two lateral flanges of the trough section, hence also after a 180° rotation about a vertical axis. To this extent no special aligning of the wear tub is necessary in the course of installation or exchange. Besides, by this measure unilateral wear can be compensated, which may occur e.g. in downgrade advance. The bearing spindles for the fixing shackles are designed as screw connections. Moreover the fixing shackles may comprise pivoting levers which serve to apply a tool and consequently to release the fixing shackles for the replacement process. According to the invention, the fixing shackles are lockable by means of locking wedges. To this end the locking wedges can be driven into the cross webs of the stowage side lateral flange on the back between the fixing shackles and locking cutouts. Preferably the trough section is formed as a mounting frame with a sectional trough member welded into the empty run with formation of a rigid box. The trough bottom of the mounting frame may have an inspection hole and the wear tub a corresponding centering plate on its underside and thereby it is easily fixed against longitudinal and transversal forces. Further it is provided that the mounting frame has on the end face centering bores for receiving centering pins and coupling bores for receiving coupling pins. The centering pins serve to align the mounting frame and thereby to simplify not only the installing of the coupling pins but also the placing in or pivoting in of the wear tub. Besides, the trough bottom of the mounting frame may have on the end face coupling teeth and cutouts for coarse centering.

The advantages achieved by the invention are to be seen essentially in that a trough section for a conveyor trough is realized where the mounting and exchanging of the wear tub can take place exclusively from the stowage side, on which the required walking space is available anyway, in contrast to the coal face side. This considerably facilitates the mounting and exchanging of the wear tub. In addition, in the trough section according to the invention the wear tub can be pivoted in or out, as it were, between the lateral flanges of the respective trough section of the mounting frame, so that the symmetrical application of the hoist and exact vertical lifting of the wear tub is no longer necessary. On the whole, the installing and exchanging of the wear tub can be carried out more expediently than before with the trough section of the invention.

Accordingly it is an object of the invention to provide an improved trough section for a conveyor trough which comprises a mounting frame having a bottom wall with upright side walls on each side with a trough bottom supported between the side walls and with a wet tub supported on the mounting frame over the trough bottom and having a receiving pocket on each side which receives a projection from the side wall and with at least one of the projections on one of the side walls comprising a fixing shackle which is pivotally mounted on the mounting frame and is selectively displaceable into and out of a corresponding receiving pocket.

A further object of the invention is to provide a trough section which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
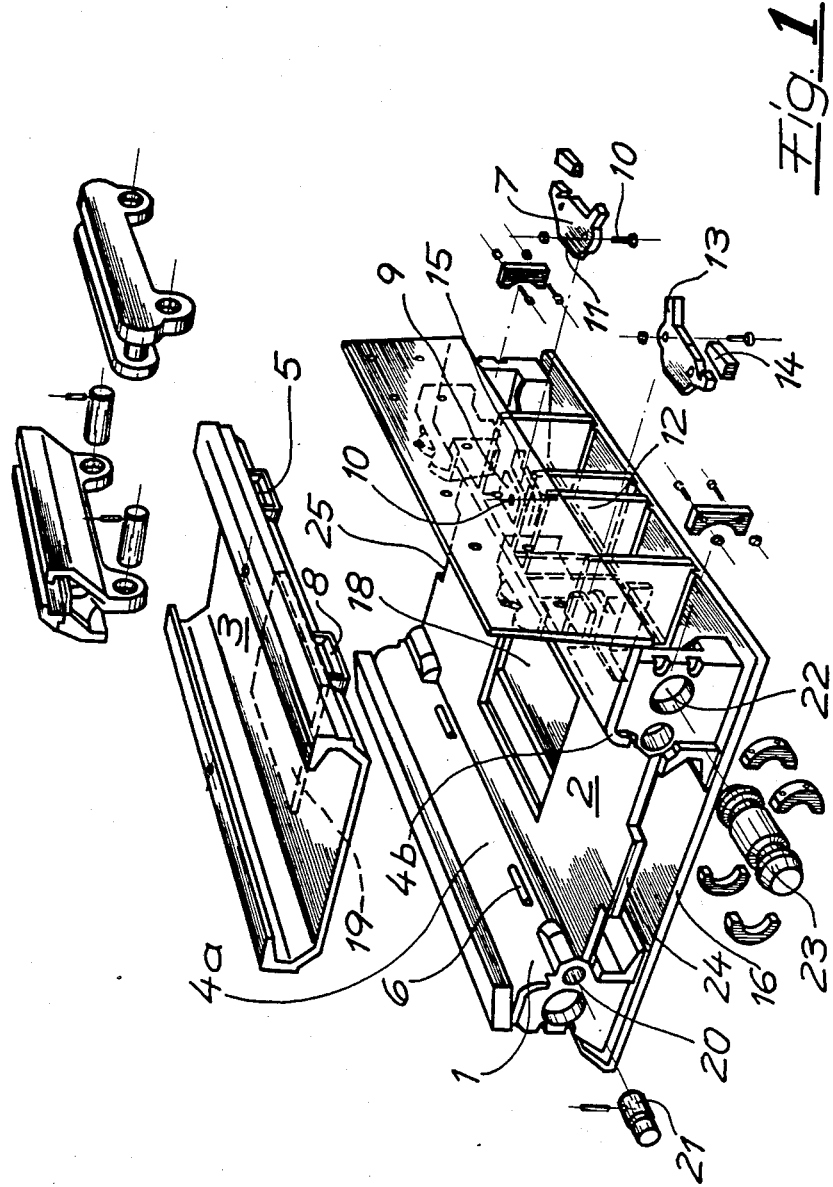
FIG. 1 is an exploded perspective view of a trough section with a wear tub according to the invention.
Figure 2:
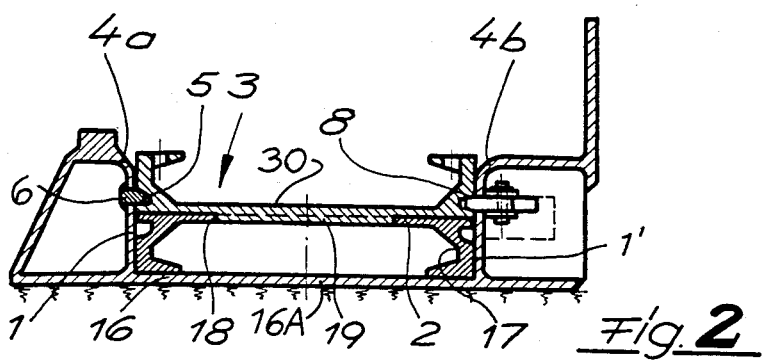
FIG. 2 is a partial vertical section through the trough section according to FIG. 1.
Figure 3:
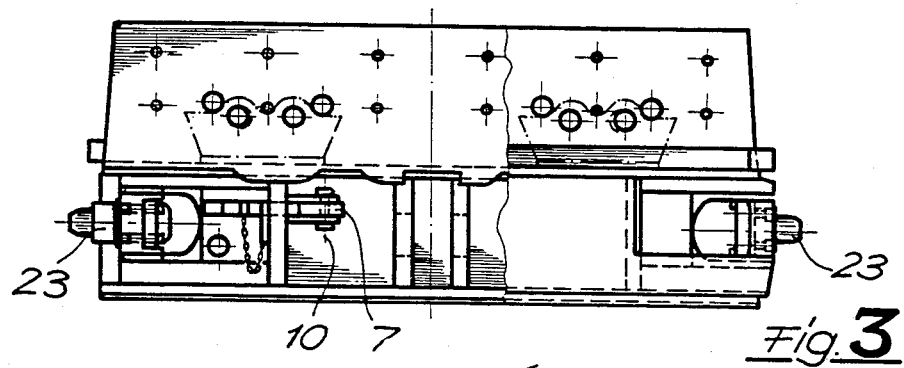
FIG. 3 is a stowage side view of the section of FIG. 2.
Figure 4:
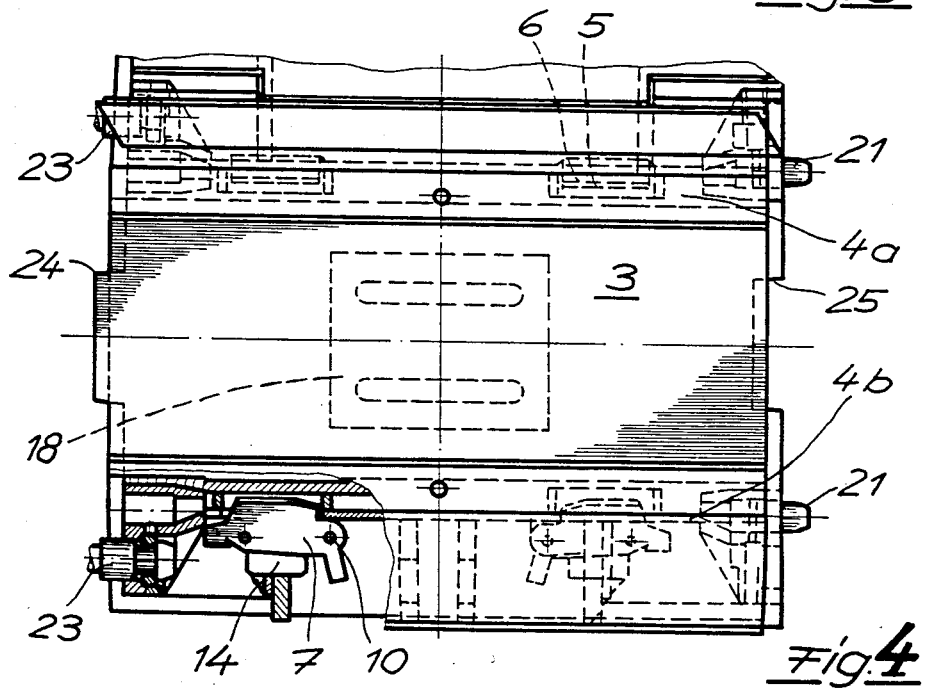
FIG. 4 is a top view of the section of FIG. 2 with a lateral flange partially broken away.

Referring to the drawings, in particular the invention embodied therein, comprises a trough section for a conveyor trough which includes a mounting frame 16 having a bottom wall 16A and an upright side wall 1,1' on each side. The mounting frame 16 includes a trough bottom 2 which is spaced above the bottom wall 16A and supported between the side walls 1,1'.

In accordance with the invention, a wear tub generally designated 3 is supported on the mounting frame 16 over the trough bottom 2 and it has one or more receiving pockets which are arranged so that they may be aligned with a corresponding projection 6 or 7 of a respective side wall 1,1'. Advantageously a plurality of spaced fixed projections or fixing lugs 6 are provided on a side wall 1 and the tub 3 is inserted so as to position a receiving pocket 5 onto an associated projection. The opposite side projection 7 comprises a fixing shackle which is advantageously pivotally mounted on the mounting frame 16 and is selectively displaceable into and out of a corresponding receiving pocket 5. Means such as a locking wedge 14 are associated with the fixing shackle 7 to lock it into an engaged position after the tub 3 is aligned properly and then locked into position.

The figures illustrate a trough section for a conveyor trough, with trough sidewalls 1,1' and trough bottom 2 connecting the trough side walls with formation of a carrying run (upper) and an empty run (lower). The wear tub 3 resting on the trough bottom 2 and having side walls forming the trough profile in the carrying run is insertable at least into the carrying run. In the region of the carrying run, the trough sidewalls 1,1' are designed as respective lateral flanges 4a and 4b for connection of the wear tub 3 on the inside. The wear tub 3 comprises on both sides one or more fixing pockets 5 on the outside of the tub and can be pivoted into the carrying run of the trough section between the lateral flanges 4a, 4b. The working side lateral flange 4a of the trough section, in fact, comprises one or more fixed fixing lugs or hinge wedges 6 engaging in the fixing pockets 5. The stowage side lateral flange 4b of the trough section comprises one or more pivotably mounted fixing shackles 7 which, in the pivoted in fixed position, engage in the associated fixing pockets 5 and are lockable.

The wear tub 3 possesses on both sides two fixing pockets 5 arranged at a preselected distance and is shorter than the trough section by a preselected measure. The fixing lugs 6 pass through the working side lateral flange 4a or are welded to the inside of the lateral flange and are formed as hinge wedges extending in the longitudinal direction of the trough. The fixing pockets 5 have conically tapering slide-in faces 8 for the fixing lugs 6. In a fixed position, the fixing shackles 7 pass through the stowage side lateral flange 4b of the trough section and are mounted between horizontal bearing cheeks 9 to pivot about vertical bearing spindles 10. In addition, the fixing shackles 7 have wedge shaped projections 11 corresponding to the fixing lugs 6, the bearing cheeks 9 being fastened or welded to the lateral flange 4b and/or cross webs 12 of the stowage side lateral flange 4b. The bearing spindles for the fixing shackles are formed as simple screw connections 10. Further the fixing shackles 7 comprise pivoting levers 13, to which tools for releasing the fixing shackles 7 can be applied. The fixing shackles 7 are lockable by means of locking wedges 14. The locking wedges 14 can be driven into the cross webs 12 of the stowage side lateral flange 4b on the back between the fixing shackles 7 and locking cutouts 15. To install and remove tub 3, it is tilted about a horizontal axis near the working side to engage pockets 5 on that side onto lugs 6, the stowage side of the tub is then either tilted down into a horizontal position or tilted out of the frame 16, depending on whether the tub is being installed or removed.

The trough section is formed as a mounting frame 16 with a sectional trough member 17 welded into the empty run with formation of a rigid box. The trough bottom 2 of the mounting frame 16 has an inspection hole 18, while the wear tub has on its underside a bottom 30 with a corresponding centering plate projection 19. Further the mounting frame 16 has on the end face centering bores 20 for receiving centering pins 21 and coupling bores 22 for receiving coupling pins 23. Lastly the trough bottom 2 of the mounting frame 16 has inter-engageable end wall coupling tongues or teeth 24 and cutouts or recesses 24.

While a specific embodiment of the invention has been shown and described in detail to illustrate the application of the principles of the invention, it will be understood that the invention may be embodied otherwise without departing from such principles.

What is claimed is:

1. A trough section for a conveyor trough having a working side and a stowage side, comprising a mounting frame having a bottom wall, a first upright side wall at the working side and a second upright side wall at the stowage side, said bottom wall being connected to and between said side walls to form space for upper and lower trough section above said bottom wall, a wear tub at least in said upper section supported on said lower trough section between said first and second side walls, said tub forming a trough profile for said upper section, said side walls forming lateral flanges for said wear tub, said wear tub having at least on pocket on each side thereof, at least one fixing lug fixed to said first upright side wall and extending into said upper section and into engagement with said at least one pocket on one side of said wear tub adjacent said working side, said at least one pocket on said working side and said at least one fixed fixing lug being shaped for engagement of said fixing lug in said pocket while tilting said wear tub and rotating said wear tub about a horizontal axis near said working side to bring said wear tub into supporting engagement onto said bottom wall, at least one fixing shackle pivotally mounted about a vertical axis on said second upright side wall and extending through said second upright side wall for engaging said at least one pocket of said wear tub on a side of said wear tub adjacent said stowage side, and locking means for locking said pivotally mounted fixing shackle into said pocket adjacent said stowage side when said wear tub is supported on said lower trough section.

2. A trough section according to claim 1, wherein said wear tub has on both sides two fixing pockets arranged in spaced longitudinal locations.

3. A trough section according to claim 1, including a plurality of pockets and fixed fixing lugs longitudinally spaced on said stowage side, said fixing lugs being welded to said first upright side wall and said pockets being defined in said wear tub adjacent said working side, said fixing lugs having a hinge wedge shape extending in the longitudinal direction for permitting pivoting of said tub about the horizontal axis adjacent the working side.

4. A trough section according to claim 3 wherein said pockets have conically tapering slide-in faces permitting a hinge connection of said lugs.

5. A trough section according to claim 1, wherein said wear tub is shorter in the longitudinal direction than said mounting frame.

6. A trough section according to claim 1, including a plurality of pockets and fixed fixing lugs longitudinally spaced on said stowage side, said fixing lugs extend through said first upright side wall and said pockets being defined in said wear tub adjacent said working side, said fixing lugs having a hinge wedge shape extending in the longitudinal direction for permitting pivoting of said tub about the horizontal axis adjacent the working side.

7. A trough section according to claim 1, including a pair of vertically spaced horizontal bearing cheeks arranged respectively above and below said shackle, a vertical bearing spindle carried between said cheeks supporting said shackle for pivotal movement, said shackle being wedge shaped, said mounting frame including transverse web members supporting said bearing cheeks.

8. A trough section according to claim 7, wherein said bearing spindles comprise screw connections.

9. A trough section according to claim 7, wherein said shackles comprise pivoting levers.

10. A trough section according to claim 1, wherein said locking means comprises a locking wedge for locking said shackle, said mounting frame including a transverse cross web forming a recess, said locking wedge being drivable into the recess of said cross webs and against said shackle.

11. A trough section according to claim 1, wherein said lower trough section has an inspection hole, said wear tub having an underside with a centering plate projecting portion disposed in said inspection hole when said wear tub is supported on said lower trough section.

12. A trough section according to claim 1, wherein said mounting frame has an end face with a centering bore and a centering pin engagageable in said end face for connecting a next adjacent section.

13. A trough section according to claim 1, wherein said lower trough section has an edge on one end with a projection and an edge on an opposite end with a recess engageable with said projection.

* * * * *